(12) United States Patent
Pantorp

(10) Patent No.: US 8,190,132 B2
(45) Date of Patent: May 29, 2012

(54) NUMBER TO A NAME

(75) Inventor: Rikard Pantorp, Oxie (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1027 days.

(21) Appl. No.: 11/869,950

(22) Filed: Oct. 10, 2007

(65) Prior Publication Data

US 2009/0098864 A1    Apr. 16, 2009

(51) Int. Cl.
*H04M 3/42*    (2006.01)
*H04M 1/725*    (2006.01)
*H04W 4/00*    (2009.01)

(52) U.S. Cl. ............... 455/414.1; 455/412.1; 455/412.2; 455/466

(58) Field of Classification Search ............... 455/412.1, 455/412.2, 414.1, 415, 466
See application file for complete search history.

(56) References Cited

U.S. PATENT DOCUMENTS

| | | | |
|---|---|---|---|
| 7,003,327 B1 * | 2/2006 | Payne et al. ............... | 455/566 |
| 2005/0059418 A1 | 3/2005 | Northcutt | |
| 2007/0155409 A1 | 7/2007 | Goyal et al. | |
| 2007/0266099 A1 * | 11/2007 | Wang et al. ............... | 709/206 |
| 2008/0242322 A1 * | 10/2008 | Scott et al. ............... | 455/466 |

OTHER PUBLICATIONS

Derwent, "Method for Transmitting and Receiving Phone Book Content as Short Message Service in Mobile Communication Terminal", Jun. 28, 2002, XP002290689, 2 pages.
International Search Report corresponding to PCT/EP2008/054183 mailed Jul. 11, 2008, 3 pages.

* cited by examiner

*Primary Examiner* — Un C Cho
(74) *Attorney, Agent, or Firm* — Harrity & Harrity, LLP

(57) ABSTRACT

Embodiments disclosed may include a mobile terminal for communication in a wireless communication network comprising a transmitter for transmitting a contact message, a user interface for entering contact information sent in the contact message, a processing unit for executing commands entered by means of the user interface and a visual presentation unit for displaying the user interface and contact message to be transmitted. The user interface is adapted for providing means for adding to the contact message a selectable contact identifier which represents a contact and wherein the processing unit is adapted for associating the selectable contact identifier with a contact number. Also, embodiments disclosed include a method and computer program as well as a signal in a wireless communication network operating along the lines outlined for the mobile terminal.

13 Claims, 3 Drawing Sheets

NUMBER TO A NAME

TECHNICAL FIELD

Embodiments disclosed herein may relate to communications in a wireless communication network. More precisely, embodiments disclosed herein may relate to the transmission of contact information in a wireless communication network.

BACKGROUND

In today's wireless communication networks there may be several ways that contact information is sent between two users.

One straightforward way of sending the contact information of the sending party to the receiving party would be to simply call the receiving party. The receiving party would then see the telephone number of the sender on its display and add the telephone number to its contact list. However, the receiving party would need to add the name and perhaps some other contact details to the contact list in order to identify the sending party next time the sending party calls.

Similarly, when receiving text or multimedia messages from sending parties which are not known, the adding of the persons name in order add him/her to the contact list of the receiving party may have to be performed manually.

One more convenient way of transmitting contact data to a receiving party would be sending so called vCards or verityCards. Vcards are a form of electronic business cards including, among other things, the telephone number, e-mail address, home address, home page address, alternative telephone numbers, etc., of the sender. Originally, vCards have been used in e-mail communication, but their use has expanded to mobile terminals as well. Having received a vCard, a user of a mobile terminal may add the person in the vCard message to its contact list.

The sending party may also send vCards containing contact information for users other than the sending party itself by choosing one or more users from the sender's contact list and sending the contact to a receiving party.

Sending a vCard may presuppose however, that the contact details for the person in question are available in the contact list of the sending party.

Thus the above methods of transmitting contact information may have the disadvantage that it may be complicated to send a contact number of a person not available in the contact list or the address book of the sending party. Hence, if a sending party, for example, wishes to send a telephone number or other contact numbers of someone not present in the contact list, this data has to be entered in the text of the SMS/MMS and transmitted to the receiving party. The receiving party, in turn, wishing to contact the person whose contact data appears in the SMS/MMS received will have to activate a number search or number find function on the telephone in order to be able to call the person. Moreover, the receiving party will have to perform a tedious contact data entering procedure for the contact in the SMS/MMS received, where either the name of the contact having the contact number in the SMS/MMS received has to be entered or both the name and the contact number of the contact person have to be entered.

SUMMARY

One aspect of one or more embodiments may be directed to a mobile terminal for communication in a wireless communication network. The mobile terminal may include a transmitter for transmitting a contact message, a user interface for entering contact information sent in the contact message, a processing unit for executing commands entered by means of the user interface and a visual presentation unit for displaying the user interface and contact message to be transmitted, wherein the user interface may be adapted for providing means for adding to the contact message a selectable contact identifier representing a contact and wherein the processing unit may be adapted for associating the selectable contact identifier with a contact number.

In this fashion, a more flexible way of sending contact information to a receiving party may be achieved. The contact identifier may be chosen to be a text string, picture, a sound, a voice message or any other information identifying the contact.

Also, contact information of a contact not present in the contact list of a mobile terminal of the sending party may be more easily transmitted to the receiving party.

Another aspect of one or more embodiments disclosed herein may be directed to a method for communication in a wireless communication network. The method may include: a) selecting a contact message format by means of a user interface; b) entering a selectable contact identifier to be sent with the contact message; c) entering a contact number associated with the contact of the selectable contact identifier and; d) transmitting the contact message.

It should me mentioned here that the method according to one or more embodiments disclosed herein may be suited to be implemented by the mobile terminal of described earlier.

Yet another aspect of embodiments disclosed herein may be directed to a computer program for use in a communication in a wireless communication network. The program may include instruction sets for: a) selecting a contact message format by means of a user interface; b) entering a selectable contact identifier to be sent with the contact message; c) entering contact information associated with the contact the selectable contact identifier and; d) transmitting the contact message Here, it should be pointed out that the computer program according to one or more embodiments may be adapted for executing the method steps of the processes described earlier and to be stored in a mobile terminal according to one or more embodiments disclosed herein.

Finally, yet another aspect of one or more embodiments disclosed herein may be directed to a signal in a wireless communication network. The signal may include a contact identifier of a sending party; a contact identifier of a receiving party; a selectable contact identifier different from the contact identifiers of the sending and receiving party and representing the target to be contacted; wherein the selectable contact identifier may be associated with a contact number different from the contact numbers of the sending and the receiving party.

DETAILED DESCRIPTION OF PREFERRED EMBODIMENTS

Figure 1A:
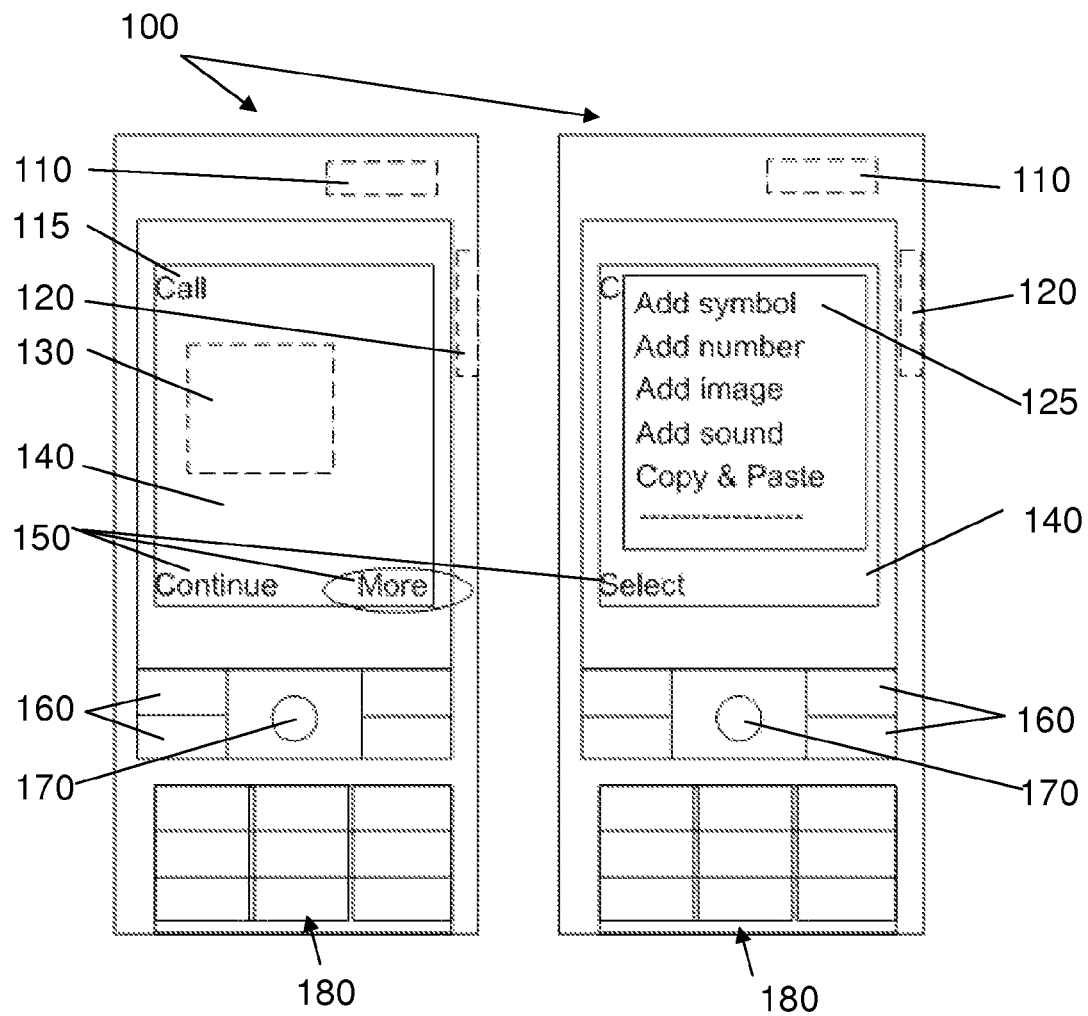
FIG. 1a illustrates an embodiment of a mobile terminal according to one embodiment when sending contact information.

FIG. 1a shows an exemplary mobile terminal 100 according to one embodiment illustrating the sending of contact information messages.

The mobile terminal 100 according to the embodiment in FIG. 1a may include a transmitter/receiver 110, a memory 120 and a processing unit 130 depicted by dashed lines in FIG. 1a. Moreover, the mobile terminal 100 may include a display 140 showing the text or graphic user interface 150 operated by the functional buttons 160, 170. Apart from the functional buttons 160, 170 the mobile terminal 100 according to one embodiment may also include a standard set of alphanumerical keys 180 as is well known to the skilled person.

The transmitter/receiver 110 combination in the mobile terminal 100 may be adapted for making and receiving voice calls as well as transmitting and receiving data. The processing unit 130 may be adapted to code and decode data transmitted or received through the transmitter/receiver 110 combination and also to instruct the display 140 to show the text or graphical user interface 150.

The main functions of the memory 120 may include storing contact information data, images, sounds, music, videos and other pieces of data.

Using the functional buttons 160, 170, a user may be able to navigate through the text or graphical user interface displayed on the display 140, while he may use the alphanumeric buttons 180 to type in telephone numbers or numerical digits and text.

By means of the text or graphical user interface 150 a user may select the SMS/MMS (Short Message Service/Multimedia Message Service) function using the functional buttons 160, 170 on the mobile terminal 100 in order to send a contact number. Using the alphanumerical keys 180 on the mobile terminal 100, the user may write the text of the SMS/MMS message where he wishes to add a telephone number to a name he will specify in the SMS/MMS message. The mobile terminal 100 may also be configured to provide the user with the option of adding a contact number other than the telephone number, such as the ICQ number or the VoIP (Voice-over-IP)-number or other contact numbers.

In this example, the option "More" appearing on the display 140 of the mobile terminal 100 may allow the user to select a list of possible alternatives to be added to a name. For example, by selecting the option "Add symbol" shown in a menu bar 125, the user may select a contact from his contact list stored in the memory 120 of the mobile terminal 100. The processing unit 130 may be adapted to add the name of the selected contact rather than the telephone number into the text of the SMS/MMS message, since the telephone number on its own will likely not give much information to the receiving party.

Also, the user interface 150 may be adapted to provide the user with the choice of also adding other items to the SMS/MMS message which may be present in the contact list. Thus, if the contact list stored in the memory 120, apart from a name and a telephone number, also may include an image of the contact and/or a sound for the contact, these items may also be added to the SMS/MMS message apart from the name of the contact. Another alternative shown in the right image in FIG. 1a would be the option to add images, sounds and other items from the menu bar 125 by selecting the appropriate option. This would have the advantage that if images, sounds or other items are not present in the contact list, but which the sending party wishes to add to the SMS/MMS message, may be selected separately.

The processing unit 130 may then be configured to display the name of the contact from the contact list in the SMS/MMS message and to link it with a telephone number ICQ number, VoIP-number or some other contact information from the contact list. Thus the processing unit may produce a selectable contact in the SMS/MMS message. A receiving party may then simply by clicking the contact name call the contact directly.

Also, the processing unit 130 of the mobile terminal 100 may be configured to react to certain keywords typed by the sending party in the SMS/MMS-message, such as, for example, "Call", "Connect to", ICQ and similar keywords. By recognizing these keywords, the processing unit 130 may configured to select the corresponding contact number from the contact list. Thus typing "Call" in the SMS/MMS message and selecting a name from the contact list may automatically add the contact name and the associated telephone number or numbers to the SMS/MMS message. Likewise, by typing the keyword "ICQ" in the SMS/MMS and selecting the option "More" in the user interface 150 the processing unit 130 may, after the sending party has selected "Add symbol" from the menu 125, add the name of the contact and the associated ICQ-number. Both the telephone number and the ICQ number may be hidden in the SMS/MMS message.

If however, the contact number which the sending party wishes to transmit to a receiving party is not present in the contact list in the mobile terminal 100, the user interface 150 may offer the sending party the option to type in the name of the contact and thereafter by marking the name and choosing the "More" option select the alternative "Add number" from the menu bar 125. In this way, the SMS/MMS-message may contain the same text and the name of the contact, while the telephone number of the contact may be hidden. Also, other contact information other than telephone numbers may be added in this fashion.

Figure 1B:
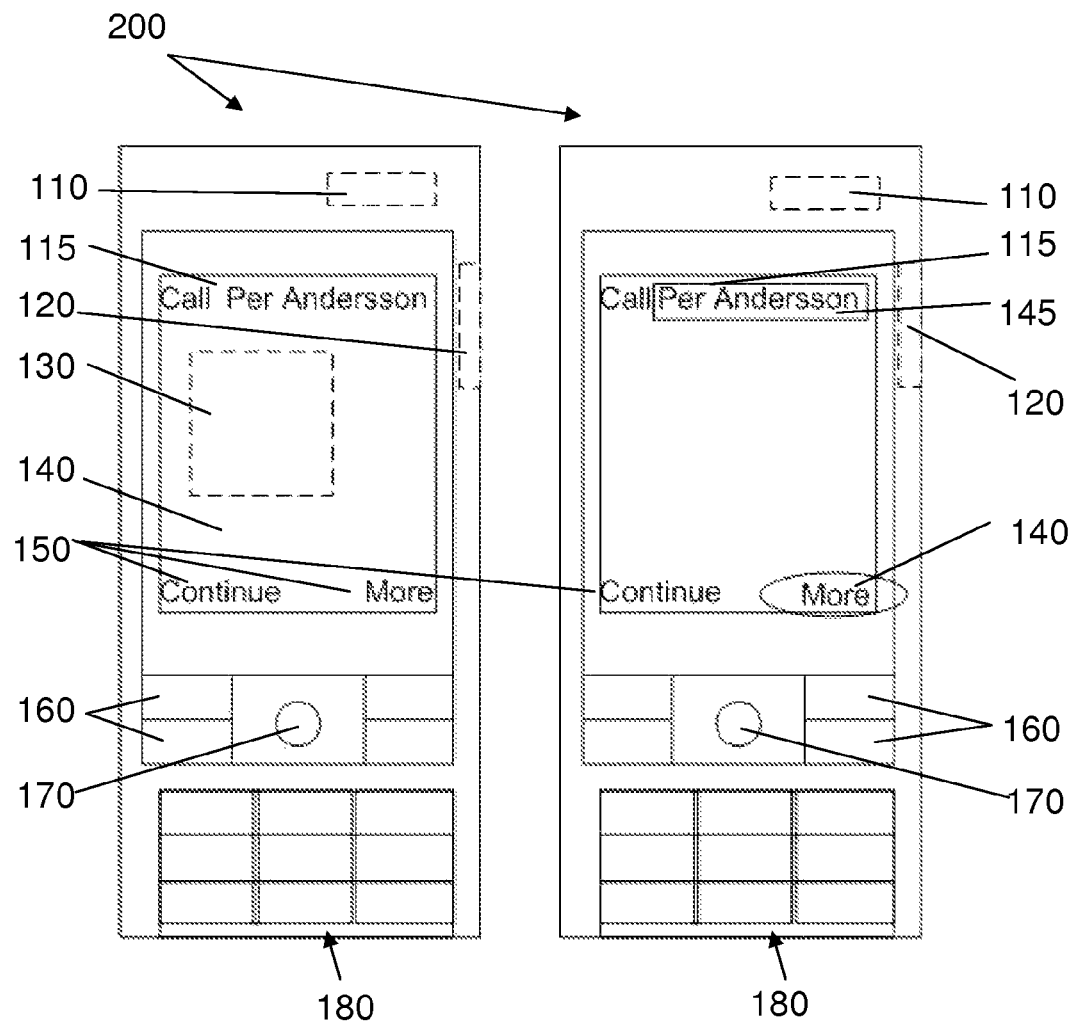
FIG. 1b illustrates the same mobile terminal according to one embodiment when receiving contact information.

Turning now to FIG. 1b, the mobile terminal 200 of the receiving party is displayed. For the sake of simplicity, the same type of mobile terminal as in the case of the sending party is chosen. Since the mobile terminals may be identical, reference signs for the common parts of the mobile terminals 100 and 200 will be maintained. To avoid unnecessary repetition, the associated component parts of the mobile terminals 100, 200 will therefore not be explained again.

In FIG. 1b the receiving party has just received a contact message 115 from the sending party via the transmitter/receiver combination 110. One variant of the contact message 115 is shown as an SMS message. However, the contact message 115 may equally have been an enhanced SMS message that may include graphics or an MMS message including images and sounds.

In this example, however, the contact message 115 contains the phrase "Call Per Andersson", where a telephone number may be associated with the contact name "Per Andersson". Apart from a telephone number, the contact name may also be associated with an ICQ number or a VoIP-number, thus making it very convenient to contact the person represented by the name in the contact message 115.

The mobile terminal 200 of the receiving party may be adapted for providing the receiving party with the option of selecting the contact name by either using the navigation key 170 or by pressing one of the functional keys 160 on the mobile terminal 200. In this fashion the receiving party may select the contact name, which for the sake of clarity, may appear shown in inverted color or marked as seen in the right part of FIG. 1b. In longer contact messages, where, for example, the contact name may not be visible on the display 140 of the mobile terminal 200, the receiving party may simply use the navigation key 170 in order to scroll down to the contact name until it gets marked.

The mobile terminal 200 provides the receiving party of the contact message 115 the option to either press one of the functional buttons 160 or the navigation button 170 in order to initiate an action associated with the contact name. Thus, if a telephone number is associated with the contact name 145, the pressing of the functional buttons 160 or the navigation button 170 may result in calling the telephone number. Otherwise, if other contact information is associated with the contact name 145, such as ICQ-number or VoIP-number, the processing unit 130 may be adapted to initiate the starting of the ICQ client and call the ICQ number or start the VoIP-software and call the corresponding VoIP-number.

As already stated earlier, the type of contact information sent from the sending party and associated with the contact name 145 may already be indicated by certain keywords in the contact message 115, such as "Call" or "ICQ", "Browse" and so on.

Thus, in contrast to the limited possibilities when sending and receiving contact information today, such as only being able to call the telephone number of the party that sent the contact message or adding the contact information to the contact list of the receiving party, the mobile terminal according to one embodiment may offer simplified ways of contacting the person whose contact data have been sent.

Moreover, the mobile terminal 200 of the receiving party offers the receiving party via the user interface 150 (which may be text based or graphical) the option to add the contact name 145 to its own contact list by, for example, selecting the "More"-option 150 from the user interface and choosing the appropriate alternative from a menu bar, wherein the menu bar may be similar to the menu bar 125 in FIG. 1a. The contact list may be stored in the memory 120 of the mobile terminal 200.

As already mentioned earlier in the description of FIG. 1a, the contact message 115 may, apart from text, also include images (such as the image of the contact person), sounds or other items.

It may also be possible to send a voice mail message or a sound file as the contact message 115, where the contact message may include the name of the contact and a number added to that contact. One way to do it may be using existing functions in standard mobile terminals, such as voice dialing and voice commands activated for the contact. Thus, when the receiving party receives the voice message or the sound file, he or she may just press one of the functional buttons 160 or the navigation key 170 and dial the contact number.

Figure 2:
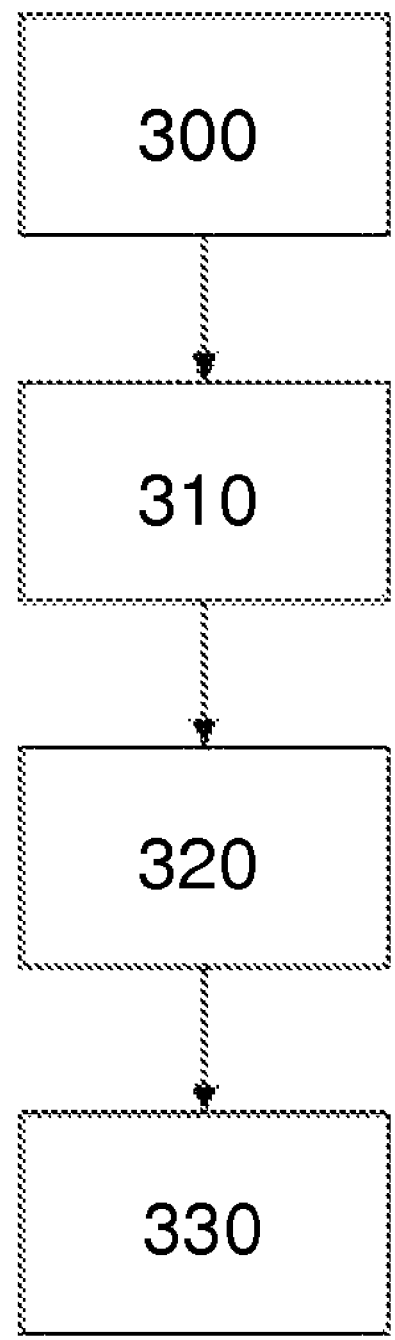
FIG. 2 illustrates a process according to one embodiment in the form of a flowchart.

Referring to FIG. 2, an exemplary process according to a method in one embodiment are depicted in the form of a flowchart.

At block 300, a sending party may use the user interface on the mobile terminal, such as the user interface 150 in order to select the option to send a contact message. Here, the contact message may have different formats, such as SMS (Short Message Service), MMS (Multimedia Message Service) or some other format, such as E-mail or Bluetooth message.

At block 310, a processing unit of the mobile terminal, such as the processing unit 130, may display the user interface for the writing of the contact message, depending on the choice of information message format, and allows the sending party to write text and add the name, nickname or some other contact identifier to the contact message. One example may be writing a keyword indicating the action the receiver of the contact message may perform and the name or nickname of the contact person. Thus typing "Call Per Andersson" may be one example. Also, writing a keyword and adding an image of the contact person or a voice message may be other alternatives.

One additional possibility may be that the processing unit may be configured to react to certain keywords written by the sending party in the contact message and from there display menu alternatives corresponding to the keyword. Thus, upon recognizing, for example, the keyword "call" in the contact message "Call Per Andersson", the processing unit may offer the alternative to add a telephone number to the name of the contact person "Per Andersson". Likewise, other keywords may trigger other types of menu alternatives.

One other alternative may be to select a contact from an existing list of contacts stored in the memory of the mobile terminal of the sending party, such as the memory 120. Here, the sending party would only need to select the name of the contact from the list and optionally also the telephone number, ICQ number, VoIP-number or some other contact number. In one embodiment, the contact message itself may then only display the name of the contact.

However, the method of one or more embodiment may not be limited to the writing of keywords in contact messages. The contact message may contain any type of text or other items, and it may be clear to the receiving party that a contact message has been received.

Thereafter, the sending party may use the user interface of the mobile terminal to transmit the contact message to a receiving party via the transmitter/receiver combination of the mobile terminal.

The process according to one embodiment, and illustrated the example of FIG. 2, may be executed by a computer program stored in a memory (internal or external) in the mobile terminals in FIGS. 1a and 1b such as the memory 120. The mobile terminals 100 and 200 may perform certain operations, as described in detail above, in response to processing unit 130 executing software instructions contained in a computer-readable medium, such as the memory 120. A computer-readable medium may be defined as a physical or logical memory device. The software instructions may be read into the memory 120 from another computer-readable medium or from another device via transmitter/receiver 110. The software instructions contained in the memory 120 may cause processing unit 130 to perform processes that are described above.

Moreover, the contact message may be sent in the form of a signal in a wireless communication network, where the signal corresponds to the contact message described in FIGS. 1a, 1b and 2.

The embodiments described above serve only as illustrative examples of one or more embodiments and should not be considered as limitation of the invention. Many more variants of the invention will be apparent to the skilled person after having read the above description and studied the accompanying drawings.

The term "comprises/comprising" when used in this specification or claims is taken to specify the presence of stated features, integers, steps or components but does not preclude the presence or addition of one or more other features, integers, steps, components or groups thereof.

Thus, the scope of the invention is only to be regarded as limited by the scope and spirit of the accompanying patent claims.

The invention claimed is:

1. A mobile terminal for communication in a wireless communication network, the mobile terminal comprising:
   a transmitter for transmitting a contact message;
   a user interface for entering contact information sent in the contact message;
   a processing unit for executing commands entered through the user interface; and
   a visual presentation unit for displaying the user interface and the contact message to be transmitted,
   wherein, the user interface provides for adding to the contact message a selectable contact identifier representing a contact, the processing unit is adapted for associating the selectable contact identifier with a contact number and adapted to react to one or more keywords written by a user in the contact message and display menu alternatives corresponding to said one or more keywords, the user interface provides a sending party with a choice to select the selectable contact identifier from a plurality of contact identifiers including a contact name, nickname, image, and sound, the user interface provides, if the contact number is stored in a list, the sending party with a choice to select the contact number from the list stored in a memory of the mobile terminal, and the user interface provides, if the contact number is not stored in the list, the sending party with an option to type a name associated with the contact number and provides, in response to receiving the name, an additional option to select additional information from a menu.

2. The mobile terminal according to claim 1, wherein the mobile terminal further comprises a memory for storing a plurality of contact identifiers and associated contact numbers, wherein the plurality of contact identifiers includes the selectable contact identifier.

3. The mobile terminal according to claim 1, wherein the contact information comprises a telephone number, an ICQ number or a VoIP (Voice-over-IP)-number.

4. The mobile terminal according to claim 1, wherein the user interface is adapted to provide a sending party with a choice to manually enter the contact identifier and the associated contact number.

5. The mobile terminal according to claim 1, where the contact number comprises a telephone number, an ICQ number or a VoIP (Voice-over-IP)-number.

6. The mobile terminal according to claim 1 wherein the contact number associated with the selectable contact identifier is different than a contact number of the sending party.

7. The mobile terminal according to claim 1, wherein the contact message comprises one of SMS (Short Message Service), MMS (Multimedia Message Service) or Bluetooth message.

8. A method for communication in a wireless communication network, the method comprising:

receiving a selection of a contact message format through a user interface;

providing a user with menu alternatives in reaction to one or more keywords written by the user in the contact message;

receiving, through the user interface, an entry of a selectable contact identifier, from a plurality of identifiers including a contact name, nickname, image, and sound, to be sent with the contact message;

receiving, through the user interface, an entry of a contact number associated with the selectable contact identifier, where the user interface provides, if the contact number is stored in a list, a choice to select the contact number stored in the list, and if the contact number is not stored in the list, the user interface provides an option to type a name associated with the contact number and provides, in response to receiving the name, an additional option to select additional information from a menu; and transmitting the contact message.

9. The method according to claim 8, further comprising:

storing, in a memory, a plurality of contact identifiers and associated contact numbers, wherein the plurality of contact identifiers includes the selectable contact identifier.

10. The method according to claim 8, wherein the contact information comprises a telephone number, an ICQ number or a VoIP (Voice-over-IP)-number.

11. The method according to claim 8, wherein the contact number comprises a telephone number, an ICQ number or a VoIP (Voice-over-IP)-number.

12. The method according to claim 8, wherein the contact number associated with the selectable contact identifier is different than a contact number of the sending party.

13. The method according to claim 12, wherein the contact message comprises one of SMS (Short Message Service), MMS (Multimedia Message Service) or Bluetooth message.

* * * * *